(12) United States Patent
Guo et al.

(10) Patent No.: US 12,129,426 B1
(45) Date of Patent: Oct. 29, 2024

(54) BIOMIMETIC NACRE-TOUGHNESS CEMENT SLURRY BASED ON IN-SITU POLYMERIZATION OF FLUID LOSS ADDITIVE, PREPARATION METHOD AND APPLICATION THEREOF

(71) Applicant: Tianjin University, Tianjin (CN)

(72) Inventors: Jintang Guo, Tianjin (CN); Ming Liu, Tianjin (CN); Miaomiao Hu, Tianjin (CN)

(73) Assignee: Tianjin University, Tianjin (CN)

( * ) Notice: Subject to any disclaimer, the term of this patent is extended or adjusted under 35 U.S.C. 154(b) by 0 days.

(21) Appl. No.: 18/661,631

(22) Filed: May 12, 2024

(30) Foreign Application Priority Data

Jul. 25, 2023 (CN) .......................... 202310918780.7

(51) Int. Cl.
| | |
|---|---|
| *C09K 8/487* | (2006.01) |
| *C04B 24/16* | (2006.01) |
| *E21B 21/00* | (2006.01) |
| *E21B 33/138* | (2006.01) |
| *C04B 103/00* | (2006.01) |
| *C04B 103/46* | (2006.01) |

(52) U.S. Cl.
CPC ............ *C09K 8/487* (2013.01); *C04B 24/163* (2013.01); *E21B 21/003* (2013.01); *E21B 33/138* (2013.01); *C04B 2103/0046* (2013.01); *C04B 2103/46* (2013.01)

(58) Field of Classification Search
CPC ..... C09K 8/487; E21B 21/003; E21B 33/138; C04B 24/163; C04B 2103/0046; C04B 2103/46
USPC ........................................................ 524/650
See application file for complete search history.

(56) References Cited

FOREIGN PATENT DOCUMENTS

| CN | 109824823 A | * | 5/2019 |
|---|---|---|---|
| CN | 115975133 A | * | 4/2023 |

OTHER PUBLICATIONS

CNIPA, Notification of First Office Action for CN202310918780.7, Dec. 19, 2023.
Tianjin University (Applicant), Reply to Notification of First Office Action for CN202310918780.7, w/ (allowed) replacement claims, Jan. 31, 2024.
CNIPA, Notification to grant patent right for invention in CN202310918780.7, Mar. 22, 2024.

* cited by examiner

*Primary Examiner* — Kelechi C Egwim
(74) *Attorney, Agent, or Firm* — Hemisphere Law, PLLC; Zhigang Ma (57) ABSTRACT

Biomimetic nacre-toughness cement slurry based on in-situ polymerization of a fluid loss additive, a preparation method and an application thereof are provided. The preparation method includes: dissolving 2-acrylamido-2-methylpropane sulfonic acid monomer and carboxylic acid monomer in deionized water, adjusting pH to 5.5-6.5, then adding an acrylamide monomer, and uniformly stirring to obtain a monomer solution; adding an initiator and a catalyst into the monomer solution, and then stirring to obtain a pre-polymerization solution; adding cement particles into the pre-polymerization solution under low-speed stirring, and then performing high-speed stirring to obtain the biomimetic nacre-toughness cement slurry. The obtained cement slurry can optimize a microstructure of cement while possessing a well capacity for controlling fluid loss, improve deformation ability and toughness of a cement sheath, and effectively improve brittleness defect of the cement sheath.

8 Claims, 4 Drawing Sheets

BIOMIMETIC NACRE-TOUGHNESS CEMENT SLURRY BASED ON IN-SITU POLYMERIZATION OF FLUID LOSS ADDITIVE, PREPARATION METHOD AND APPLICATION THEREOF

CROSS-REFERENCE TO RELATED APPLICATION

This application claims priority to a Chinese patent application No. 202310918780.7, filed to China National Intellectual Property Administration (CNIPA) on Jul. 25, 2023, which is herein incorporated by reference in its entirety.

TECHNICAL FIELD

The disclosure relates to the technical field of drilling and cementing for oilfield development, particularly to biomimetic nacre-toughness cement slurry based on in-situ polymerization of a fluid loss additive, a preparation method and an application thereof.

BACKGROUND

With continuous exploitation and improvement of onshore conventional oil and gas reservoirs, global oil and gas industries have shifted to develop deep, deep-sea, and unconventional oil and gas reservoirs. Therefore, a service environment faced by an oil and gas well is becoming increasingly complex. The shift in the focus of exploitation of the oil and gas well has raised higher requirements for cementing engineering, and has also led to a certain shift in the focus of cementing operations. For example, performance requirements of cement slurry used in the cementing engineering change from meeting safety construction in the cementing engineering to meeting sealing performance of the cementing engineering. As one of key barriers of integrity of the oil and gas well, long-term sealing integrity of a cement sheath is of great significance for the efficient and stable exploitation of oil and gas resources. However, due to brittleness of G class oil-well cement, high-pressure stress and strong impact force generated by the mining construction operations such as well completion and increasing production by fracturing, can cause serious impact damage to the cement sheath, so that the micro-cracks will occur in the matrix of the cement sheath or a micro-annular gap between the cement sheath and the stratum as well as the casing, which seriously affecting a sealing stability of the oil and gas well and safe exploitation of the oil and gas resources.

In order to improve toughness and elastic deformation capacity of the cement sheath in the cementing engineering, a proper amount of toughening material, such as nano whiskers, fibers, elastic-toughness particles, and polymers, is usually added into the cement slurry. Among them, the polymer additives are of great significance due to their flexible and adjustable molecular structures and numerous selections in the toughening aspect of cement-based materials. Typical toughening polymers such as styrene, 1,3-butadiene polymer, epoxy resins (with a chemical formula of $(C_{11}H_{12}O_3)_n$), etc. However, an addition of conventional polymers has limited improvement in the toughness of the cement sheath. In addition, due to buckling and agglomeration of polymer chain segments in an alkaline environment for the cement matrix, a network structure formed by the polymer inside the cement is not perfect, which can form some mechanical deficiencies and bring in certain negative effects to mechanical properties of cement (referred to cured cement slurry). Recently, free-radical polymerization (FRP) of monomers with small molecules is introduced into the cement-based materials, which endows excellent toughness and deformation capacity of the cement, thereby raising extensive attention of many scholars in the field of architecture. However, the introduction of the FRP of monomers in the cementing engineering has not been reported.

SUMMARY

An objective of the disclosure is to provide a method for preparing biomimetic nacre-toughness cement slurry based on in-situ polymerization of a fluid loss additive, aiming at resolving technical deficiencies existing in the related art. The cement slurry obtained by the method according to the disclosure can optimize a microstructure of cement while possessing a well capacity for controlling filtration loss.

Another objective of the disclosure is to provide the biomimetic nacre-toughness cement slurry based on in-situ polymerization of the fluid loss additive prepared by the above method.

Still another objective of the disclosure is to provide an application of the biomimetic nacre-toughness cement slurry based on in-situ polymerization of the fluid loss additive in cementing engineering, which improves deformability and toughness of a cement sheath used in the cementing engineering and effectively reduces brittleness of the cement sheath.

In order to achieve the above objectives of the disclosure, a technical solution adopted by the disclosure is as follows.

The method for preparing the biomimetic nacre-toughness cement slurry based on in-situ polymerization of the fluid loss additive includes the following steps:

step 1, dissolving a 2-acrylamido-2-methylpropane sulfonic acid (abbreviated as AMPS with a chemical formula of $C_7H_{13}NO_4S$) monomer and a carboxylic acid monomer in sequence in deionized water to obtain a first monomer solution, adjusting potential of hydrogen (pH) of the first monomer solution to 5.5-6.5 by using an alkali solution, then adding an acrylamide (abbreviated as AM with a chemical formula of $C_3H_5NO$) monomer into the first monomer solution, and uniformly stirring the first monomer solution added with the AM monomer to obtain a second monomer solution; the AMPS monomer, the carboxylic acid monomer, the deionized water, and the AM monomer being added according to a mass ratio of the AMPS monomer:the carboxylic acid monomer:the deionized water:the AM monomer;

step 2, adding an initiator and a catalyst into the second monomer solution obtained in the step 1, and stirring the second monomer solution added with the initiator and the catalyst to obtain a pre-polymerization solution;

step 3, adding cement particles into the pre-polymerization solution obtained in the step 2 by low-speed stirring, and then performing high-speed stirring on the pre-polymerization solution added with the cement particles to obtain the biomimetic nacre-toughness cement slurry.

In the above technical solution, in the step 1, the carboxylic acid monomer is acrylic acid (abbreviated as AA with a chemical formula of $C_3H_4O_2$) or itaconic acid (abbreviated as IA with a chemical formula of $C_5H_6O_4$) or maleic anhydride (abbreviated as MAH with a chemical formula of $C_4H_2O_3$).

In the above technical solution, in the step 1, the AM monomer is at least one selected from the group consisting of AM and N, N-dimethylacrylamide (abbreviated as DMAA with a chemical formula of $C_5H_9NO$); and when a mixture of the AM and the DMAA is added into the first monomer solution, a mass ratio of the AM to the DMAA is in a range of 1.2:2 to 3:1.5.

In the above technical solution, in the step 1, the alkali solution is a sodium hydroxide (NaOH) solution.

In the above technical solution, in the step 1, the mass ratio of the AMPS monomer:the carboxylic acid monomer: the deionized water: the AM monomer is (5-11.2):(0.5-1.6): (220-352):(1.8-4.5).

In the above technical solution, in the step 2, the initiator is ammonium persulfate (abbreviated as APS with a chemical formula of $(NH_4)_2S_2O_8$) or potassium persulfate (abbreviated as KPS with a chemical formula of $K_2S_2O_8$).

In the above technical solution, in step 2, the catalyst is N,N,N',N'-tetramethyl ethylenediamine (abbreviated as TEMED with a chemical formula of $C_6H_{16}N_2$).

In the above technical solution, in the step 2, an addition amount of the initiator is in a range of 2 wt % to 3 wt % of masses of the monomers (i.e., masses of the AMPS monomer, the carboxylic acid monomer, and the AM monomer); and a molar mass ratio of the initiator to the catalyst is in a range of 1:1 to 1:1.5.

In the above technical solution, in the step 3, a mass ratio of the pre-polymerization solution to the cement particles is 0.44:1.

In the above technical solution, in the step 3, the pre-polymerization solution obtained in the step 2 is added into a cement slurry cup, and then the cement particles are added into the pre-polymerization solution by the low-speed stirring.

In the above technical solution, in the step 3, a rotating speed of the low-speed stirring is 4,000 revolutions per minute (rpm) ±200 rpm and a time for the low-speed stirring is 15 seconds (s); and a rotating speed for the high-speed stirring is 12,000 rpm ±500 rpm and a time for the high-speed stirring is 35 s ±1 s.

In another aspect, the disclosure further includes the biomimetic nacre-toughness cement slurry prepared by the above method.

In another aspect of the disclosure, the disclosure further includes an application of the biomimetic nacre-toughness cement slurry, which includes: applying the biomimetic nacre-toughness cement slurry in cementing engineering.

Compared with the related art, the disclosure has the following beneficial effects.

1. The preparation method provided by the disclosure is simple and easy to operate; raw materials used in the preparation method can be widely obtained, so that the preparation method provided by the disclosure can be applied in large-scale engineering application.

2. The disclosure introduces the in-situ polymerization of the fluid loss additive into the cement slurry. Therefore, in a pumping process of the cement slurry, a reaction for free radicals of the monomers can be carried out simultaneously with a hydration reaction of the cement slurry, and a fluid loss additive polymer well combined with the cement particles and hydration products is formed in the cement slurry, so that permeation of the cement slurry mixing water to the stratum is controlled, and the cement slurry is endowed with better control capacity of water loss.

3. During curing the obtained biomimetic nacre-toughness cement slurry based on in-situ polymerization of the fluid loss additive, amide groups or carboxyl groups in the monomers and the obtained polymer can be chelated with calcium ions ($Ca^{2+}$) in the cement particles and the hydration products to form a —COO—Ca carboxylate complex, so that an adhesive force between the polymer obtained by the in-situ polymerization and the hydration products is improved, thereby promoting the polymer intertwining within the hydration products to form a continuous polymer film.

4. Nacre's "brick-mortar" microstructure is formed among an interior of the cured cement, the hard hydration product, and soft organic matters through intertwining combination. Therefore, pores and cracks in a matrix of the cement are fulfilled, which improves compactness of the cement. Furthermore, internal and external stresses can be effectively dissipated and the crack deflection effect can be induced, thereby preventing further expansion of the cracks inside the matrix of the cement. Namely, the cement is endowed with excellent impact resistance and toughness, as well as deformation capacity, so that the cement can be well applied to the cementing engineering.

DETAILED DESCRIPTION OF EMBODIMENTS

The disclosure will be further described in detail below with reference to illustrated embodiments. It should be understood that the illustrated embodiments described herein are only used to explain the disclosure and are not intended to limit the disclosure.

Comparative Example 1

A method for preparing oil-well cement slurry includes the following steps.

Figure 1:
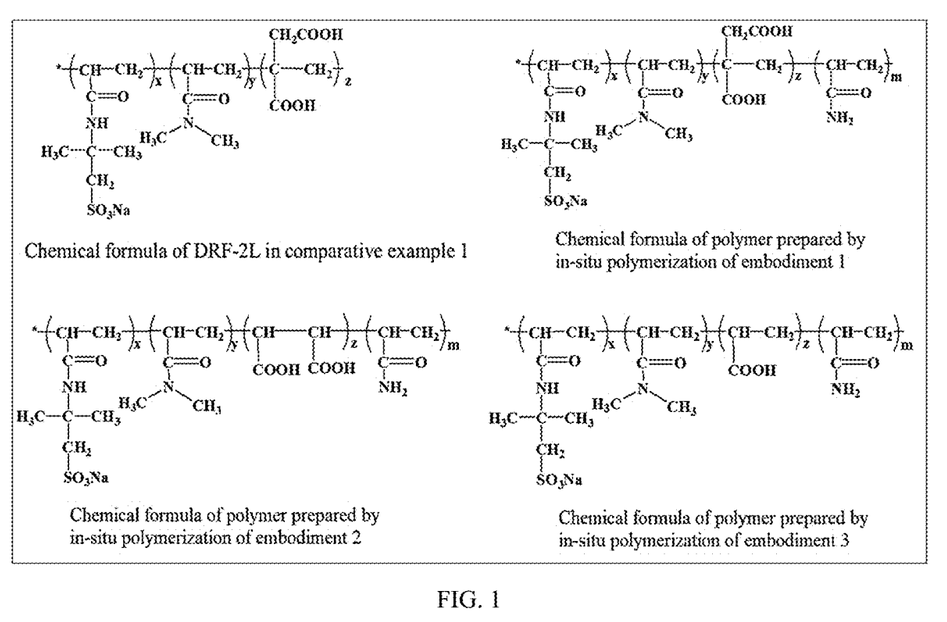
FIG. 1 illustrates a schematic diagram of chemical formulas of a fluid loss additive DRF-2L in a comparative example 1, and polymers generated by in-situ polymerization of monomers in an embodiment 1, an embodiment 2, and an embodiment 3.

Step 1, 15 grams (g) of a fluid loss additive DRF-2L (i.e., a chemical formula of the fluid loss additive DRF-2L shown in FIG. 1) is dissolved in 220 g of deionized water to obtain a solution.

Step 2, the solution obtained in the step 1 is transferred into a cement slurry cup to obtain a pre-polymerization solution, 500 g of cement particles is added into the pre-polymerization solution within 15 seconds (s) under a rotating speed of low-speed stirring being 4,000 revolutions per minute (rpm) ±200 rpm, and then the rotating speed is increased to 12,000 rpm ±500 rpm for high-speed stirring, and the high-speed stirring continues for 35 s to obtain the oil-well cement slurry that is uniformly dispersed.

Embodiment 1

A method for preparing biomimetic nacre-toughness cement slurry based on in-situ polymerization of a fluid loss additive includes the following steps.

Step 1, 5 g of 2-acrylamido-2-methylpropane sulfonic acid (abbreviated as AMPS with a chemical formula of $C_7H_{13}NO_4S$ and also referred to AMPS monomer) and 0.5 g of itaconic acid (IA) are sequentially dissolved in 220 g of deionized water according to their masses (i.e., according to the given mass ratio) to obtain a first monomer solution, potential of hydrogen (pH) of the first monomer solution is adjusted to 5.5 by using a sodium hydroxide (NaOH) solution, then 4.5 g of a mixture of acrylamide (abbreviated with AM with a chemical formula of $C_3H_5NO$) and N,N-dimethylacrylamide (abbreviated as DMAA with a chemical formula of $C_5H_9NO$) is added into the first monomer solution, and the first monomer solution added with the mixture of the AM and the DMAA is stirred uniformly to obtain a second monomer solution. Specially, a mass ratio of the AM to the DMAA in the mixture is 3:1.5.

Step 2, ammonium persulfate (abbreviated as APS with a chemical formula of $(NH_4)_2S_2O_8$) and N,N,N',N'-tetramethyl ethylenediamine (abbreviated as TEMED with a chemical formula of $C_6H_{16}N_2$) are added into the second monomer solution obtained in the step 1, and the second monomer solution added with the APS and the TEMED is rapidly stirred to obtain a pre-polymerization solution. Specially, an addition amount of the initiator (i.e., the APS) is 3 wt % of a total mass of the monomers (i.e., masses of the AMPS, the IA, and the mixture of the AM and the DMAA), and a molar mass ratio of the initiator to the catalyst (i.e., the APS to the TEMED) is 1:1.5.

Step 3, the pre-polymerization solution is added into a cement slurry cup, then 500 g of cement particles is added into the pre-polymerization solution within 15 s under a rotating speed of low-speed stirring being 4,000 rpm ±200 rpm, and then the rotating speed is increased to 12,000 rpm ±500 rpm for high-speed stirring, and the high-speed stirring continues for 35±1 s to obtain the biomimetic nacre-toughness cement slurry based on in-situ polymerization of the fluid loss additive that is uniformly dispersed.

Embodiment 2

A method for preparing biomimetic nacre-toughness cement slurry based on in-situ polymerization of a fluid loss additive includes the following steps.

Step 1, 9.6 g of AMPS and 0.6 g of maleic anhydride (abbreviated as MAH with a chemical formula of $C_4H_2O_3$) are sequentially dissolved in 264 g of deionized water according to their masses to obtain a first monomer solution, pH of the first monomer solution is adjusted to 6 by using a NaOH solution, then 1.8 g of DMAA is added into the first monomer solution, and the first monomer solution added with the DMAA is stirred uniformly to obtain a second monomer solution.

Step 2, APS and TEMED are added into the second monomer solution obtained in the step 1, and the second monomer solution added with the APS and the TEMED is rapidly stirred to obtain a pre-polymerization solution. Specially, an addition amount of the initiator (i.e., the APS) is 2 wt % of a total mass of the monomers (i.e., masses of the AMPS, the MAH, and the DMAA), and a molar mass ratio of the initiator to the catalyst (i.e., the APS to the TEMED) is 1:1.2.

Step 3, the pre-polymerization solution is added into a cement slurry cup, then 600 g of cement particles is added into the pre-polymerization solution within 15 s under a rotating speed of low-speed stirring being 4,000 rpm ±200 rpm, and then the rotating speed is increased to 12,000 rpm ±500 rpm for high-speed stirring, and the high-speed stirring continues for 35±1 s to obtain the biomimetic nacre-toughness cement slurry based on in-situ polymerization of the fluid loss additive that is uniformly dispersed.

Embodiment 3

A method for preparing biomimetic nacre-toughness cement slurry based on in-situ polymerization of a fluid loss additive includes the following steps.

Step 1, 11.2 g of AMPS and 1.6 g of acrylic acid (abbreviated as AA with a chemical formula of $C_3H_4O_2$) are sequentially dissolved in 352 g of deionized water according to their masses to obtain a first monomer solution, potential of hydrogen (pH) of the first monomer solution is adjusted to 6.5 by using a sodium hydroxide (NaOH) solution, then 3.2 g of a mixture of AM and DMAA is added into the first monomer solution, and the first monomer solution added with the mixture of the AM and the DMAA is stirred uniformly to obtain a second monomer solution. Specially, a mass ratio of the AM to the DMAA in the mixture is 1.2:2.

Step 2, APS and TEMED are added into the second monomer solution obtained in the step 1, and the second monomer solution added with the APS and the TEMED is rapidly stirred to obtain a pre-polymerization solution. Specially, an addition amount of the initiator (i.e., the APS) is 2.5 wt % of a total mass of the monomers (i.e., masses of the AMPS, the AA, and the mixture of the AM and the DMAA), and a molar mass ratio of the initiator to the catalyst (i.e., the APS to the TEMED) is 1:1.

Step 3, the pre-polymerization solution is added into a cement slurry cup, then 800 g of cement particles is added into the pre-polymerization solution within 15 s under a rotating speed of low-speed stirring being 4,000 rpm ±200 rpm, and then the rotating speed is increased to 12,000 rpm ±500 rpm for high-speed stirring, and the high-speed stirring continues for 35±1 s to obtain the biomimetic nacre-toughness cement slurry based on in-situ polymerization of the fluid loss additive that is uniformly dispersed.

In order to verify the in-situ polymerization of the monomers in the prepared biomimetic nacre-toughness cement slurry based on in-situ polymerization of the fluid loss additive and fluid loss reduction capacity of the prepared cement slurry, the oil-well cement slurry prepared in the comparative example 1 and the cement slurry prepared in the embodiments 1-3 are used to perform a static API fluid loss test (used to determine static filtration characteristics of the cement slurry and need for treatment with fluid loss additives). Instruments and experimental procedures in the test refer to a technical solution disclosed in "Testing of well cements", i.e., API Recommended Practice 10 B. Results for the test are shown in the following Table 1.

TABLE 1

Static API fluid loss for four kinds of cement slurry prepared in
the comparative example 1 and the embodiments 1-3

| Sample | API fluid loss (mL) |
| --- | --- |
| Comparative example 1 | 68 |
| Embodiment 1 | 56 |
| Embodiment 2 | 20 |
| Embodiment 3 | 56 |

As shown in the above Table 1, compared with the oil-well cement slurry containing the commercially available DRF-2L fluid loss additive prepared in the comparative example 1, the cement slurry prepared in the embodiments 1-3 also has better control capacity of water loss. Specially, the static API fluid losses of the cement slurry prepared in the embodiments 1-3 are lower than that of the comparative example 1. The better control capacity of water loss illustrates that free-radical polymerization (FRP) of fluid loss additive monomer can successfully occur in the cement slurry, thereby forming a polymer with a certain fluid loss control capability. FIG. 1 illustrates a chemical formula of the fluid loss additive DRF-2L prepared by the comparative example 1, and chemical formulas of the fluid loss additives generated by the in-situ polymerization in the cement slurry prepared by the embodiments 1-3. It can be seen from FIG. 1 that the in-situ polymers formed in the cement slurry prepared by the embodiments 1-3 has adsorption groups similar to the fluid loss additive DRF-2L, such as sulfonyl hydroxide (—SO$_3$H), acylamide (—NH—CO—R), and carboxyl (—COOH). Therefore, the in-situ polymers can be effectively adsorbed on the surface of the cement particles or filled in the gap of a filter cake, thereby controlling the fluid loss of the cement slurry to the stratum. In addition, compared with directly adding the fluid loss additive DRF-2L with a relatively large molecular weight, the in-situ polymerized monomer with small molecules can be more fully dispersed in the cement slurry and adsorbed on the surface of the cement particles, so that the monomer can be combined with the cement particles to generate the fluid loss additive polymer with stronger binding capacity, and the cement slurry is endowed with better control capacity of water loss.

Figure 2A:
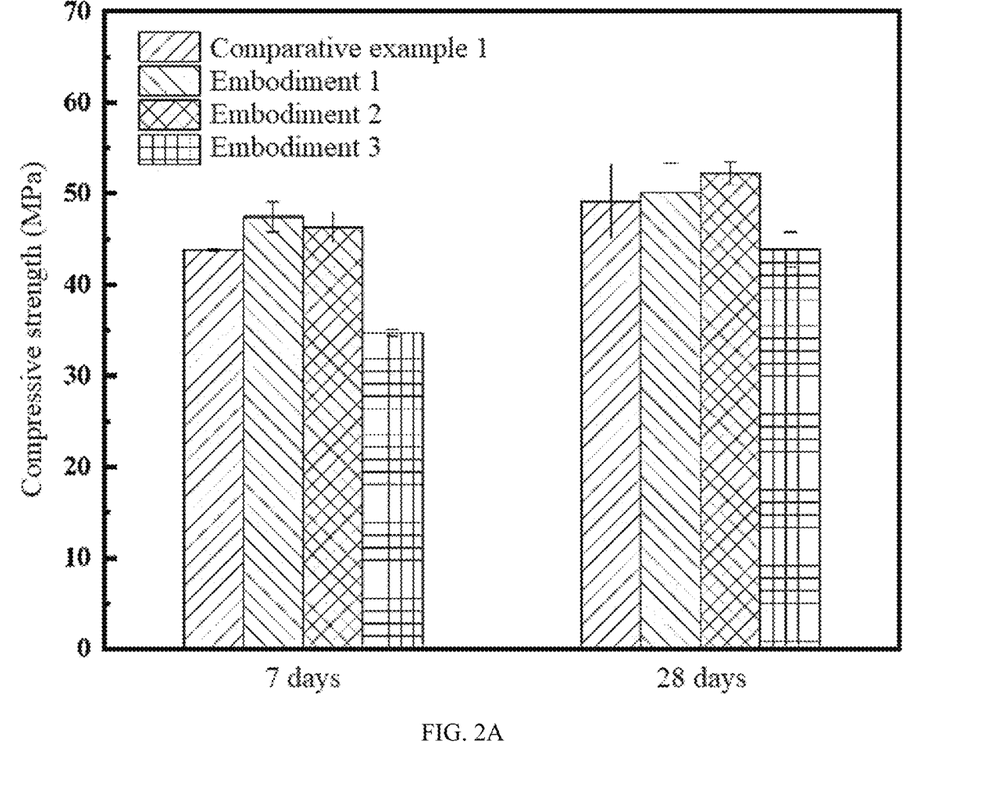
FIG. 2A illustrates a schematic diagram of compressive strengths of oil-well cement slurry prepared in the comparative example 1, and biomimetic nacre-toughness cement slurry based on in-situ polymerization of a fluid loss additive prepared in the embodiments 1-3 after curing different days.
Figure 2B:
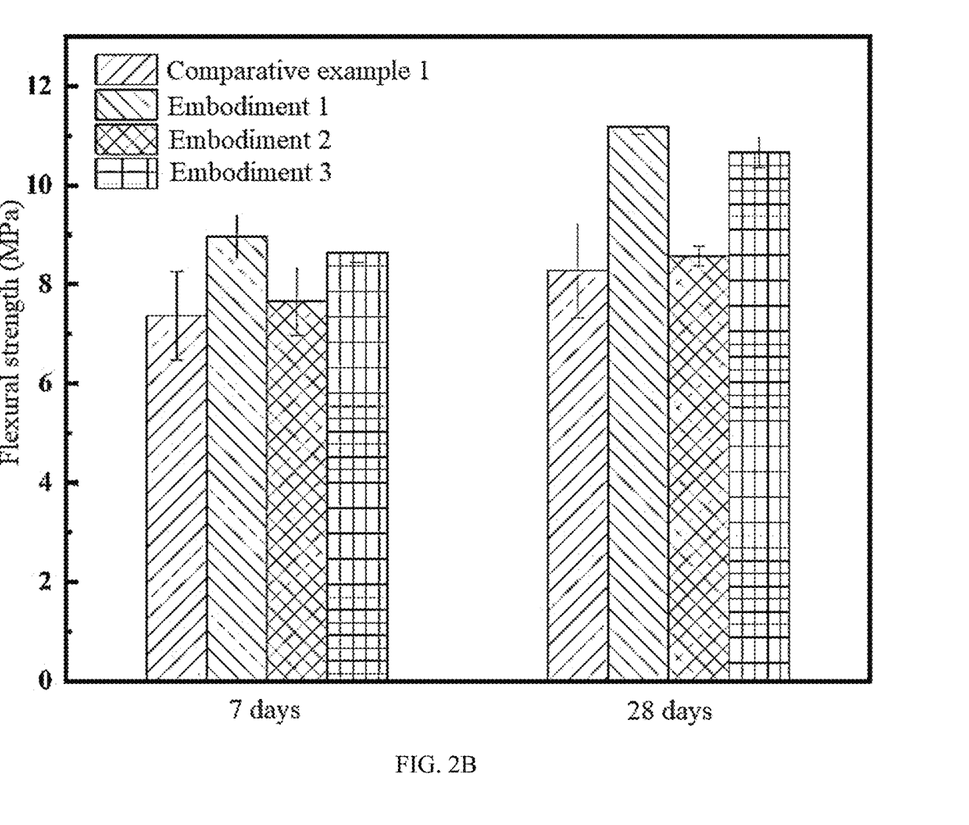
FIG. 2B illustrates a schematic diagram of flexural strengths of the oil-well cement slurry prepared in the comparative example 1, and the biomimetic nacre-toughness cement slurry based on in-situ polymerization of the fluid loss additive prepared in the embodiments 1-3 after curing different days.

Subsequently, in order to evaluate the toughening effect of the prepared biomimetic nacre-toughness cement slurry based on in-situ polymerization of the fluid loss additive on the cement sheath, mechanical properties of the cement i.e., after curing the oil-well cement slurry prepared in the comparative example 1 and the cement slurry prepared in the embodiments 1-3 are tested, and the preparation method of the cement sample and the test for the mechanical properties of the cement sample refer to "Testing of well cements", i.e., API Recommended Practice 10 B. FIG. 2A and FIG. 2B illustrate the compressive strengths and flexural strengths of the oil-well cement slurry prepared in the comparative example 1 and the cement slurry prepared in the embodiment 1-3 after being cured for different days (i.e., 7 days and 28 days).

It can be seen from FIG. 2A and FIG. 2B that the compressive strengths of the oil-well cement slurry prepared in the comparative example 1 after being cured for 7 days and 28 days are 43.7 mega Pascal (MPa) and 49.1 MPa respectively; and the flexural strengths of the oil-well cement slurry prepared in the comparative example 1 after being cured for 7 days and 28 days are 7.9 MPa and 8.4 MPa respectively. Moreover, the compressive strengths of the cement slurry prepared in the embodiment 1 after being cured for 7 days and 28 days are slightly increased compared to those of the oil-well cement slurry prepared in the comparative example 1, but the increases are not obvious. However, the flexural strengths of the cement slurry prepared in the embodiment 1 after being cured for 7 days and 28 days are significantly improved. Furthermore, after 7 days and 28 days of curing, the flexural strengths of the cement (i.e., the cement slurry after being cured) are improved by 21.6% and 35.2% respectively compared with those of the cement obtained after the curing of the oil-well cement slurry prepared in the comparative example 1. The significant increases of the flexural strengths are mainly due to the continuous and complete polymer network formed by the monomers with polymerized free radicals in the prepared cement, and then the monomers can be adsorbed on the surface of the hydration product through the complexation of the carboxyl and the sulfonyl hydroxide and $Ca^{2+}$, thereby constructing an interpenetrating hybrid dual-network structure interwoven with polymer-hydration product. Under the action of an external force, the formation of the network can absorb and dissipate energy through the flexibility of the polymer film, and prevent the expansion of the crack through the crack deflection effect. Meanwhile, the effective complexation between the polymer and the hydration product refines an interfacial transition zone within the matrix, endowing the cement with excellent bending toughness. For the cement slurry prepared in the embodiment 2, after being cured, the compressive strength after being cured for 28 days is significantly improved, but the overall flexural strength thereof is limited compared to the cement after the cement slurry prepared in the comparative example 1 is cured. This is because that in the in-situ polymerization system, there is no reactive monomer that is easy to polymerize, i.e., acrylamide, and the polymer network formed by the AMPS, the MAH, and the DMAA in the matrix of the cement is not perfect enough, thereby limiting the improvement in toughening the cement. But the overall strength and toughness of the cement obtained after curing the cement slurry prepared in the embodiment 2 are higher than those of the cement obtained after curing the oil-well cement slurry prepared in the comparative example 1. The cement slurry prepared in the embodiment 3 also illustrates a significant improvement in the flexural strength after being cured. After 28 days of curing, the flexural strength of the embodiment 3 is increased by 28.9% compared with the cement obtained after curing the oil-well cement slurry prepared in the comparative example 1. However, a delay in cement hydration caused by the excessive addition of the acrylic acid monomer leads to a decrease in the compressive strength of cement. In summary, compared with the cement after curing the oil-well cement slurry prepared in the comparative example 1, the cement obtained after curing the cement slurry prepared in the embodiments 1-3 has higher flexural strengths and excellent toughness.

Figure 3:
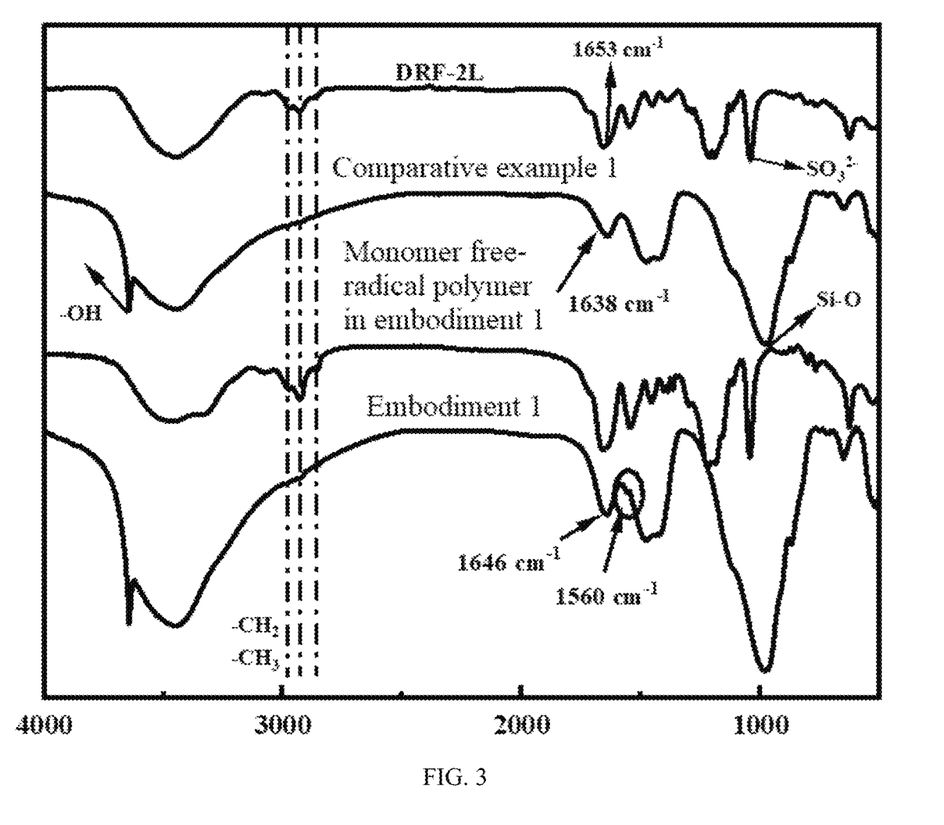
FIG. 3 illustrates a schematic diagram of infrared spectroscopy of cement obtained after curing the oil-well cement slurry prepared in the comparative example 1, cement obtained after curing the biomimetic nacre-toughness cement slurry based on in-situ polymerization of the fluid loss additive prepared in the embodiment 1, the fluid loss additive DRF-2L, and a polymer obtained by monomer free-radical polymerization in the embodiment 1.

In order to further explore the toughening mechanism of the cement slurry prepared in the embodiments 1-3 of the disclosure, the cement obtained after curing the oil-well cement slurry prepared in the comparative example 1, the cement obtained after curing the cement slurry prepared in the embodiment 1, the DRF-2L fluid loss additive, and the polymer obtained by polymerizing the free radicals of the monomers used in the embodiment 1 are subjected to infrared spectroscopy test, and the results are shown in FIG. 3. Specially, the DRF-2L fluid loss additive inside has similar functional groups as the polymer obtained by polymerizing the free radicals in the embodiment 1, thereby showing similar infrared characteristic absorption, i.e., characteristic absorption peaks of a carbonyl group (—C=O) and the carboxyl (—COOH) in the amide group appearing at 1653 cm$^{-1}$ and 1540 cm$^{-1}$ respectively. The infrared spectroscopy of the cement prepared in the comparative example 1 and the embodiment 1 shows characteristic absorption peaks attributed to a hydroxyl (O—H) in calcium hydroxide and hydrate calcium silicate (abbreviated as C—S—H with a chemical formula of $CaSi_6O_{16}(OH)$ *4H$_2$O) between 3000-3700 cm$^1$, and a stronger absorption peak appearing at 975 cm$^{-1}$ is caused by an asymmetric stretching vibration of a silicon-oxygen bond (Si—O) in the C—S—H. In addition, between 2800 cm$^{-1}$ and 2900 cm$^1$, the infrared spectroscopy of the cement prepared in the comparative example 1 and the embodiment 1 both have characteristic absorption peaks attributed to stretching vibrations of a methyl group (—CH$_3$) and methylene (—CH$_2$).

Secondly, the characteristic absorption peak of the carbonyl group in the amide group appears in the infrared spectroscopy of the two cement prepared in the comparative example 1 and the embodiment 1 respectively and is offset to a low wave number, i.e., shifting from 1653 cm$^{-1}$ to 1638 cm$^{-1}$ and 1646 cm$^{-1}$, respectively, to confirm that there exists the complexation mainly based on the COO—Ca structure between the polymer and the matrix of the cement. The cement obtained in the embodiment 1, except for the characteristic absorption peak occurring at 1640 cm$^{-1}$, also occurs a characteristic absorption peak of the carboxylate at 1560 cm$^1$, but this characteristic absorption peak is not present in the infrared spectroscopy of the cement modified by the DRF-2L fluid loss additive. This is because in alkaline cement matrix, the curling aggregation of long-chain polymers will embed some carboxyl groups, reducing their chances of further contact and complexation with the cement particles. Therefore, the number of carboxylate calcium complexes formed is limited. When the monomers are introduced into the matrix of the cement through the in-situ polymerization, the adsorption process occurs along with the polymerization reaction or even occurs before the polymerization reaction. Therefore, more chemical complexation structures are formed between the matrix of the cement and the monomers or the generated polymers, improving the interaction between organic flexible chain segments and inorganic cement matrix.

The biomimetic nacre-toughness cement slurry based on in-situ polymerization of the fluid loss additive according to the disclosure is simple in preparation process, easy to obtain the raw materials, and easy to apply in practical engineering. Furthermore, the obtained cement slurry has good control capacity of water loss, and the cement obtained after curing the cement slurry has strong toughness. In the disclosure, the in-situ polymerization of the fluid loss additive is combined with the hydration reaction of the cement particles, and the monomers with small molecules that are more easily dispersed and adsorbed are introduced into the cement slurry system. During the pumping process of the cement slurry, the polymerization reaction for the free radicals generates a fluid loss polymer in close combination with the cement particles, reducing the loss of the cement slurry mixing water to the stratum. In addition, the polymer tightly combined on the surfaces of the cement particles is interwoven and inserted within the hydration product in the curing process, and the nacre's "brick-mortar" microstructure is constructed in the matrix of the cement, so that the cured cement has excellent strength and toughness, the brittleness defect of the cement is effectively overcome, and a new selectivity is provided for long-term sealing stability of the cement sheath.

The disclosure has been described by the above illustrated embodiments, and it should be noted that, without departing from the core of the disclosure, any simple modification, amendment, or other equivalent substitution that can be made by those skilled in the related art without creative efforts all fall within the scope of the protection of the disclosure.

The above only describes the illustrated embodiments of the disclosure, and it should be noted that, for those skilled in the related art, several improvements and modifications may be made without departing from the principle of the disclosure, and these improvements and modifications should also be considered as the scope of the protection of the disclosure.

What is claimed is:

1. A method for preparing biomimetic nacre-toughness cement slurry based on in-situ polymerization of a fluid loss additive, comprising the following steps:
    step 1, dissolving a 2-acrylamido-2-methylpropane sulfonic acid monomer and a carboxylic acid monomer in sequence in deionized water to obtain a first monomer solution, adjusting potential of hydrogen (pH) of the first monomer solution to 5.5-6.5 by using an alkali solution, then adding an acrylamide monomer into the first monomer solution, and uniformly stirring the first monomer solution added with the acrylamide monomer to obtain a second monomer solution; wherein the 2-acrylamido-2-methylpropane sulfonic acid monomer, the carboxylic acid monomer, the deionized water, and the acrylamide monomer are added according to a mass ratio of the 2-acrylamido-2-methylpropane sulfonic acid monomer: the carboxylic acid monomer: the deionized water: the acrylamide monomer;
    step 2, adding an initiator and a catalyst into the second monomer solution obtained in the step 1, and stirring the second monomer solution added with the initiator and the catalyst to obtain a pre-polymerization solution; and
    step 3, adding cement particles into the pre-polymerization solution obtained in the step 2 under low-speed stirring, and then performing high-speed stirring on the pre-polymerization solution added with the cement particles to obtain the biomimetic nacre-toughness cement slurry;
    wherein in the step 1, the mass ratio of the 2-acrylamido-2-methylpropane sulfonic acid monomer: the carboxylic acid monomer: the deionized water: the acrylamide monomer is (5-11.2):(0.5-1.6):(220-352):(1.8-4.5); and
    wherein in the step 3, a mass ratio of the pre-polymerization solution to the cement particles is 0.44:1.

2. The method as claimed in claim 1, wherein in the step 1, the carboxylic acid monomer is acrylic acid or itaconic acid or maleic anhydride.

3. The method as claimed in claim 1, wherein in the step 1, the acrylamide monomer is at least one selected from the group consisting of acrylamide and N, N-dimethylacrylamide; and when a mixture of the acrylamide and the N, N-dimethylacrylamide is added into the first monomer solution, a mass ratio of the acrylamide to the N, N-dimethylacrylamide is in a range of 1.2:2 to 3:1.5.

4. The method as claimed in claim 1, wherein in the step 2, the initiator is ammonium persulfate or potassium persulfate, and the catalyst is N,N,N',N'-tetramethyl ethylenediamine.

5. The method as claimed in claim 1, wherein in the step 2, an addition amount of the initiator is in a range of 2 wt % to 3 wt % of masses of the 2-acrylamido-2-methylpropane sulfonic acid monomer, the carboxylic acid monomer, and the acrylamide monomer; and a molar mass ratio of the initiator to the catalyst is in a range of 1:1 to 1:1.5.

6. The method as claimed in claim 1, wherein in the step 3, a rotating speed of the low-speed stirring is 4,000 revolutions per minute (rpm) ±200 rpm and a time for the low-speed stirring is 15 seconds (s); and a rotating speed for the high-speed stirring is 12,000 rpm ±500 rpm and a time for the high-speed stirring is 35 s±1 s.

7. Biomimetic nacre-toughness cement slurry, wherein the biomimetic nacre-toughness cement slurry is prepared by the method as claimed in claim 1.

8. An application of the biomimetic nacre-toughness cement slurry as claimed in claim 7, comprising: applying the biomimetic nacre-toughness cement slurry in cementing engineering.

* * * * *